United States Patent
De Vincentis

(10) Patent No.: US 8,960,373 B2
(45) Date of Patent: Feb. 24, 2015

(54) ELEVATOR HAVING PASSENGER FLOW MANAGEMENT SYSTEM

(71) Applicant: KONE Corporation, Helsinki (FI)

(72) Inventor: Vittorio De Vincentis, Tabasalu (EE)

(73) Assignee: KONE Corporation, Helsinki (FI)

(*) Notice: Subject to any disclaimer, the term of this patent is extended or adjusted under 35 U.S.C. 154(b) by 0 days.

(21) Appl. No.: 13/746,670

(22) Filed: Jan. 22, 2013

(65) Prior Publication Data

US 2013/0133986 A1    May 30, 2013

Related U.S. Application Data

(63) Continuation of application No. PCT/FI2010/050659, filed on Aug. 19, 2010.

(51) Int. Cl.
| | | |
|---|---|---|
| *B66B 1/16* | (2006.01) | |
| *B66B 1/20* | (2006.01) | |
| *B66B 1/24* | (2006.01) | |
| *B66B 1/46* | (2006.01) | |
| *G01S 13/82* | (2006.01) | |

(52) U.S. Cl.
CPC ............... *B66B 1/20* (2013.01); *B66B 1/2408* (2013.01); *B66B 1/468* (2013.01); *G01S 13/82* (2013.01); *B66B 2201/4615* (2013.01); *B66B 2201/4653* (2013.01)
USPC .......................................... 187/381; 187/391

(58) Field of Classification Search
USPC .................. 187/247, 380–388, 391–393, 396
See application file for complete search history.

(56) References Cited

U.S. PATENT DOCUMENTS

| | | | | |
|---|---|---|---|---|
| 4,839,631 | A * | 6/1989 | Tsuji ............................... | 340/541 |
| 5,258,586 | A * | 11/1993 | Suzuki et al. ................. | 187/392 |
| 5,949,037 | A * | 9/1999 | Oya ............................... | 187/392 |
| 5,984,051 | A * | 11/1999 | Morgan et al. ................ | 187/392 |
| 6,202,799 | B1 * | 3/2001 | Drop .............................. | 187/388 |
| 6,707,374 | B1 * | 3/2004 | Zaharia ......................... | 340/5.31 |
| 6,868,945 | B2 * | 3/2005 | Schuster et al. .............. | 187/380 |
| 6,986,408 | B2 * | 1/2006 | Takeuchi ....................... | 187/380 |
| 7,140,469 | B2 * | 11/2006 | Deplazes et al. .............. | 187/316 |
| 7,353,915 | B2 * | 4/2008 | Zaharia et al. ................ | 187/388 |
| 7,500,544 | B2 * | 3/2009 | Hakala et al. ................. | 187/382 |
| 7,552,800 | B2 * | 6/2009 | Puskala et al. ................ | 187/384 |
| 7,581,622 | B2 * | 9/2009 | Amano ......................... | 187/384 |
| 7,712,586 | B2 * | 5/2010 | Legez ............................ | 187/391 |
| 7,735,611 | B2 * | 6/2010 | Tyni .............................. | 187/386 |
| 7,882,938 | B2 * | 2/2011 | Blackaby et al. ............. | 187/388 |
| 7,882,939 | B2 * | 2/2011 | Nakamura .................... | 187/391 |
| 8,020,672 | B2 * | 9/2011 | Lin et al. ....................... | 187/392 |
| 8,061,485 | B2 * | 11/2011 | Finschi ......................... | 187/384 |
| 8,210,321 | B2 * | 7/2012 | Finschi et al. ................ | 187/388 |
| 8,365,871 | B2 * | 2/2013 | Lee et al. ...................... | 187/392 |

(Continued)

FOREIGN PATENT DOCUMENTS

| | | |
|---|---|---|
| CN | 1810619 A | 8/2006 |
| EP | 1 764 334 A1 | 3/2007 |
| WO | WO 2007/026042 A2 | 3/2007 |
| WO | WO 2008/116963 A1 | 10/2008 |
| WO | WO 2009/132470 A2 | 11/2009 |

*Primary Examiner* — Anthony Salata
(74) *Attorney, Agent, or Firm* — Birch, Stewart, Kolasch & Birch, LLP

(57) ABSTRACT

A passenger flow management system can manage passenger flow such that elevator waiting times may be limited. The management system includes a detector configured to detect elevator passengers within a detection area located outside the building.

16 Claims, 3 Drawing Sheets

(56) References Cited

U.S. PATENT DOCUMENTS

| | | | |
|---|---|---|---|
| 8,439,169 B2 * | 5/2013 | Iio et al. | 187/387 |
| 8,464,840 B2 * | 6/2013 | Flynn et al. | 187/384 |
| 8,485,317 B2 * | 7/2013 | Gerstenkorn et al. | 187/247 |
| 8,525,652 B2 * | 9/2013 | Takeuchi | 340/286.06 |
| 8,684,142 B2 * | 4/2014 | Finschi | 187/392 |
| 2009/0014254 A1 | 1/2009 | Finschi | |
| 2012/0152660 A1 * | 6/2012 | Fujihata et al. | 187/381 |
| 2012/0160613 A1 * | 6/2012 | Friedli | 187/384 |
| 2013/0068568 A1 * | 3/2013 | Nonami | 187/381 |

* cited by examiner

ELEVATOR HAVING PASSENGER FLOW MANAGEMENT SYSTEM

This application is a Bypass Continuation of PCT/FI2010/050659 filed on Aug. 19, 2010. The entire contents are hereby expressly incorporated by reference into the present application.

FIELD OF INVENTION

This invention relates to systems for managing elevator passenger flow.

BACKGROUND OF INVENTION

In present elevator systems, the elevator passenger may use portable communication/identification devices such as rfid tags or mobile radio systems for sending control messages to an elevator control system. For example, in some elevator systems, it is possible to use a mobile phone or smart card to give a destination call to an elevator.

However, in urban environments there is a need for even more sophisticated solutions. For example, it is not always possible to increase elevator capacity as the number of people using an elevator is growing. This may have the effect that elevator waiting times become too long.

SUMMARY

Therefore it is object of the present invention to introduce an improved system for managing passenger flow inside and outside of a building such that waiting times of elevator located inside the building may be optimized, preferably reduced.

According to the invention, it possible that the elevator of for example residence building or work place is always there waiting for the passenger and ready to transport a passenger to his floor without him doing anything, without even pressing a call button.

BRIEF DESCRIPTION OF THE DRAWINGS

The invention is hereinafter described by the aid of the drawings. In these show

DESCRIPTION OF THE EMBODIMENTS

Figure 1:
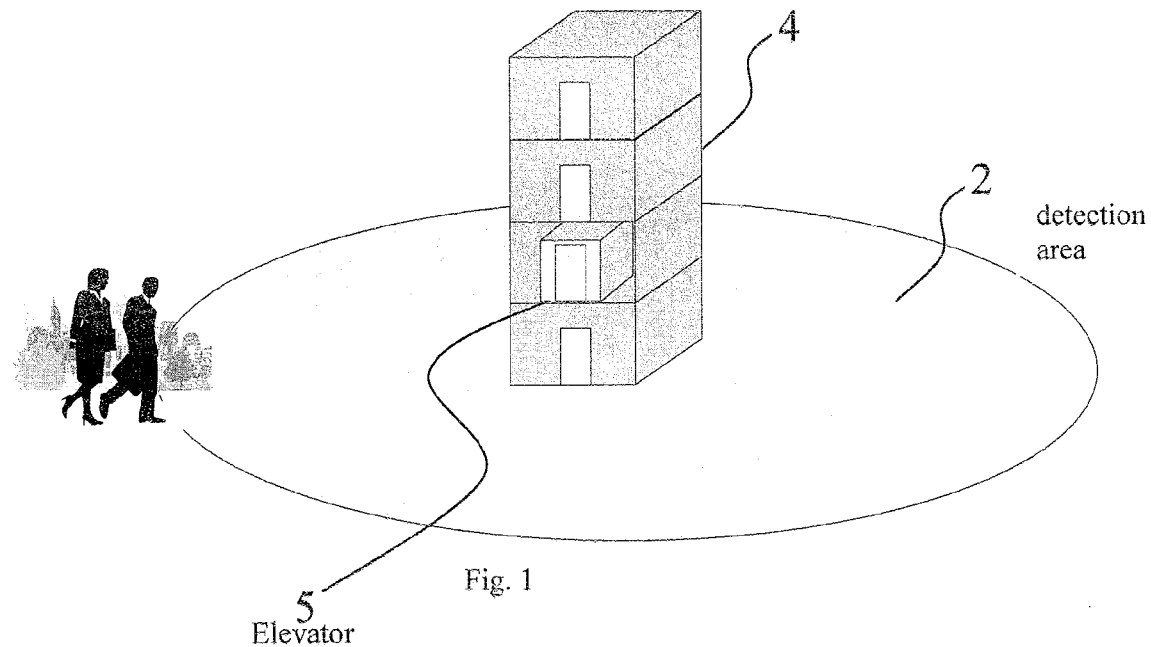
FIG. 1 shows an area within which the elevator is capable of detecting people's presence.

FIG. 1 shows people going towards an elevator 5 inside a building, and assuming also they always or usually want to go to the same floor.

The circular area 2 around the elevator represents detection area within which the elevator is capable of detecting people's presence. The elevator 5 is in the middle of the detection area. Users of an elevator are registered with the elevator system and provided with a smart card or device which contains their data and destination floor. When a registered user carrying such a card enters the detecting area 2, the elevator system will read the card info and go to the first floor and register the destination floor from the card.

Therefore, more time is provided for the elevator to start coming down to the first floor. For example, the elevator will receive the destination call from the card when the user is 50 meters away, thus improving the probability that the user will find the elevator waiting for him/her.

Figure 4:
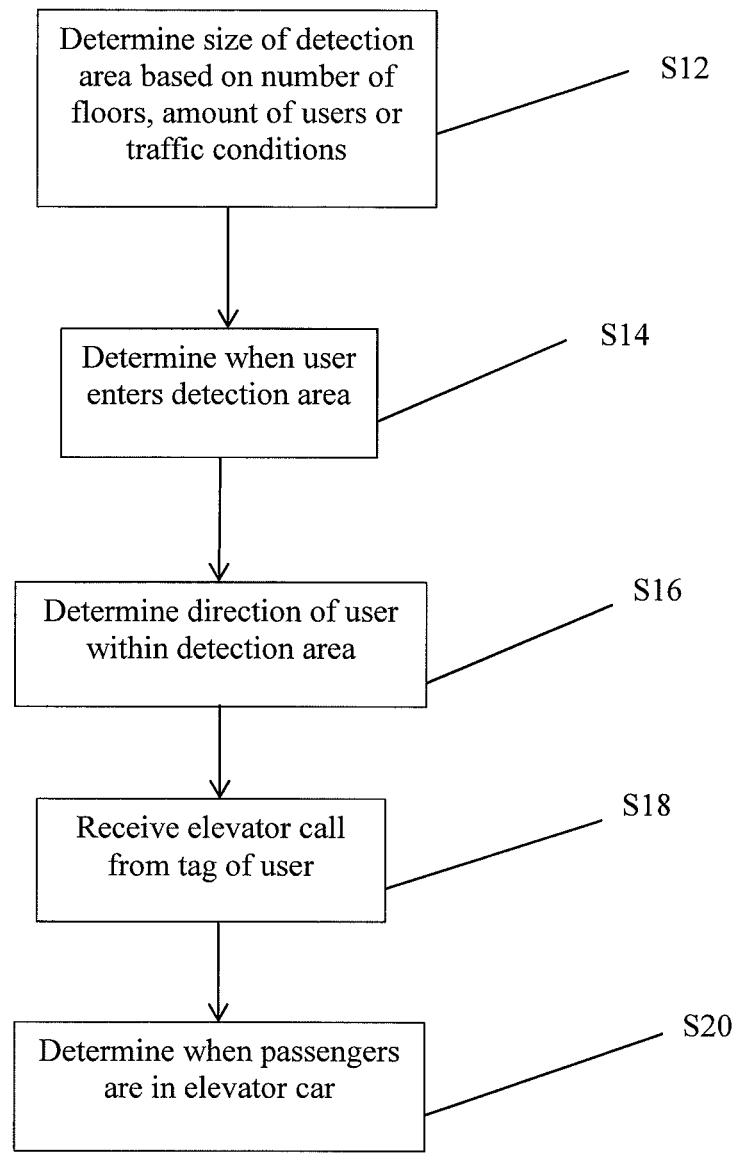
FIG. 4 is a flow chart depicting the steps used in the system.

The detection area 2 can be made smaller or larger depending, for example, on the number of floors of the building or the amount of users and typical traffic conditions, as depicted in step S12 of FIG. 4.

Additionally the usability of the elevator for non-registered users must be also taken into account; in this case, non-registered users will revert to the traditional push-button call giving.

Usage Scenarios

The usage scenarios can vary depending on following variable parameters:
number of floors
number of people simultaneously requesting elevator use
traffic condition variations during the day/night We describe below some usage scenarios depending on variations of these parameters and also general considerations:

1) Single User

When going into the building, the elevator detects the presence of a user in advance (step S14 in FIG. 4) and goes to the ground floor to be waiting for user. When the user approaches the elevator, the door are opened and waiting for the user to enter. When the user is inside the elevator, the elevator detects the user and closes the door (step S20 in FIG. 4) and starts going to the user's registered floor.

In the opposite direction, when user exits his apartment not on the ground floor, the elevator can detect the user (smart card) proximity to a landing door and automatically register a call to the ground floor. Once the user is inside the elevator, the doors close and the elevator goes to the ground floor.

2) Many Users

For illustration purposed, assume there are 10 registered users going towards the elevator, plus some non-registered users. As soon as one of the registered user is within the detection area (step S14 in FIG. 4), the elevator starts recording the corresponding destination calls (step S18 in FIG. 4). When at the ground floor, the elevator can start collecting passengers and might decide to wait for other passengers which were detected and not yet inside the elevator. In this situation a user might decide not to wait and press the door-close button instead.

If the car becomes full, then the elevator is able to detect it (step S20 in FIG. 4) and can start moving. It will be able to detect all users which are inside the car and therefore serving only these registered destination calls, while others remaining pending. It will serve those calls plus the manually given calls.

When other registered users are at landing floors, the elevator will collect them during the downward trip.

When users reach their destination floors, the elevator assumes that the user doesn't want to immediately go back and therefore doesn't register a new destination call; for example this can be done with a timeout of, let say 5 to 10 minutes; if the user does need to go back, he would give an explicit manual floor call.

Alternatively, the elevator intelligence can be improved by giving it the capacity to detect which direction the person is moving (step S16 in FIG. 4): if a person exits the elevator at the ground floor and start walking back, or if the user doesn't exits the elevator within some time period (for example about 10 seconds) then the elevator can smartly assume that the user intends to go back to his floor. For example, if the user realizes that he has forgotten something and intends to go back, all he has to do is stay inside the elevator and it will take it back. Therefore, the elevator can be thought of a means of transporting a user between two registered points (floors) in an endless way if the user decides to remain inside it.

Also some priority schemes could be devised, for example giving priority to registered users over non-registered ones, i.e. calls for registered users would be served first without stopping at intermediate manually requested floors.

Also, there is the possibility that a registered user can give a manual call, in such case the elevator must have the ability to cancel some registered user destination call if it detects that the user exited earlier at a different destination.

If a smart device is used instead of a smart card, it could give the possibility for the user to update its personal preferences, ex. the destination call, enable/disable the automatic call service, etc.

A futuristic scenario can be imagined where the elevator would have the ability to "talk" to its users: "Good morning Mr. Alexander, I see you forgot something, I'll take you back shortly to your floor" Or "Welcome Mr. Alexander, destination floor 33 has been registered for you, I will travel directly to your destination, you are the only user requesting my service at this moment".

System Design and Implementation

Next, details of possibilities and required technologies for implementation are discussed. First of all the technologies to be utilized are:

RFID
Real-Time Locating
GPS and Galileo Positioning Systems
GSM

With the combination of the above technologies it is possible to provide the elevator with registered users real-time location and therefore making decision on the destination calls automatic allocation.

It can be also decided whether this must work only for the outside/ground floor or also to all or only some of the other floors. For higher floors the detection rule is clearly different since it is not wanted to locate movement inside people's apartments.

The location system has to be able to:
  detect a person's presence within the ground floor detection area, possibly including area outside the building.
  detect a person's presence at landings at other floors
  detect the moving direction of a person, and
  detect when people are inside the car Below are proposed two different designs of the locating service using different combinations of technologies. Advantages and disadvantages of the solutions are compared.

RFID Implementation

Figure 2:
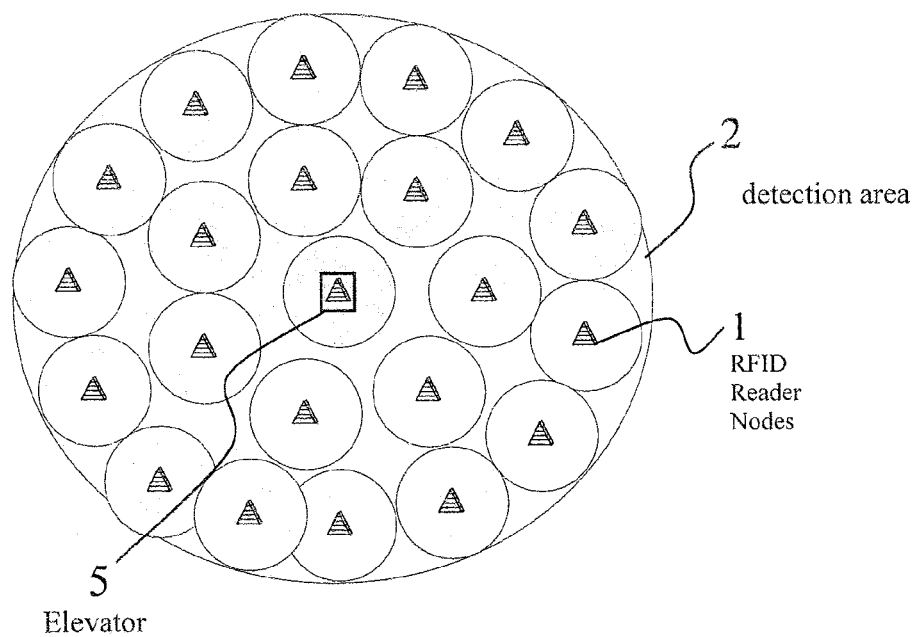
FIG. 2 shows the passenger detecting solution implementing rfid readers.

RFID has a limited range for detection, therefore a network of readers would need to be implemented, as shown in FIG. 2.

In FIG. 2, the bigger circle represent the total detection area 2 around the elevator and in the middle, is represented the elevator location 5. The other smaller circles are the single reader nodes 1 detection ranges. In such case, as people move through this area, each receiver will detect the presence (step S14 in FIG. 4) and send the corresponding info to the elevator (step S18 in FIG. 4); after that the next reader 1 will send the info and from these two readings the elevator can determine the moving direction of the person (step S16 in FIG. 4), i.e. if they are moving towards the elevator or not; the readers transmit therefore their unique identification tag and the read card info to the elevator central controller.

At other floors it is probably enough to have one reader at the landing floor and maybe a reduced detection range. Also, the RFID reader inside the car should cover only the car inside area for accurately deciding on passenger presence (step S20 in FIG. 4).

GPS-GSM Implementation

The above RFID solution is limited because it does not have a required precision in implementing the locating service. Other similar radio technologies can improve on that.

Figure 3:
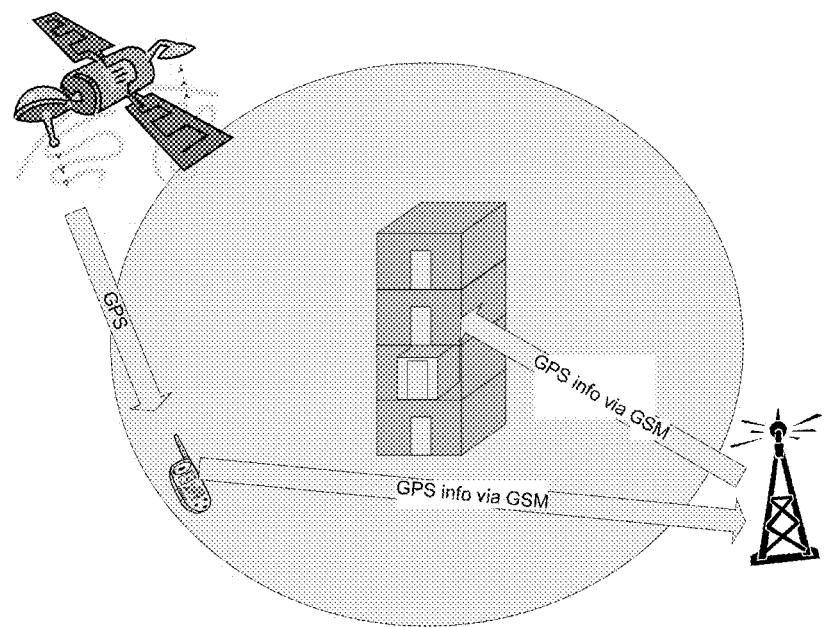
FIG. 3 shows the passenger detecting solution implementing GPS-GSM technology.

For a more precise location and positioning system solution, the GPS system coupled with GSM can be used. There is however a limitation in that GPS signals don't work indoor. A future improvement will come from the Galileo project which is scheduled to be ready in a few years time and which promises higher accuracy and possibility to work indoor. This design solution would be implemented as illustrated in FIG. 3.

In this scheme, all the user needs is a mobile phone with a GPS receiver integrated (In the future Galileo receiver). Software in the phone knows the GPS coordinates of the elevator, and when it comes within its predefined detection area, it will start sending location info to the elevator through the GSM network. Also the elevator will know its GPS location and can therefore calculate the real-time movement of people within the detection area.

With the Galileo system this scheme would work also inside the building, so no additional receivers would be needed.

TABLE 1

Designs Comparison

| Method | Advantages | Disadvantages |
|---|---|---|
| RFID | Technology already available. All info stored in a smart card. | Locating precision. Need to build a reader node network |
| GPS-GSM | Higher position info accuracy. No need to build additional hardware around the elevator Possibility to use the phone for customizing the elevator user data | Galileo not yet available. Cost of using GSM network? User needs a phone with GPS receiver |

The invention is not restricted to the above embodiments. For example, even though above embodiments have been disclosed in connection with elevator systems, invention may be applied also to escalator systems or travelator systems.

The invention claimed is:

1. An elevator management system, comprising:
  a building having a plurality of floors;
  an elevator within the building;
  a detector having a detection area;
  a tag identifying a user and a preferred floor, the tag detected by the detector; and
  a controller configured to call an elevator and enter a destination floor for the elevator upon detection of a user,
  wherein the detector determines whether the tag has entered and exited the elevator, and
  wherein the call for the destination floor of the user is canceled when the user exits the elevator before the elevator car reaches the destination floor.

2. The elevator management system of claim 1, wherein the detector establishes the position and direction of movement of the tag.

3. The elevator management system of claim 1, wherein the tag is a RFID tag.

4. The elevator management system of claim 1, wherein the tag is a mobile communication device.

5. The elevator management system of claim 1, wherein the destination floor is the preferred floor.

6. The elevator management system of claim 1, wherein the detection area extends outside the building.

7. The elevator management system of claim 1, wherein a size of the detection area is proportional to the number of floors in the building and the number of tags.

8. The elevator management system of claim 1, wherein the detector is a plurality of RFID reader nodes.

9. The elevator management system of claim 1, wherein the detector is a GPS or GSM device.

10. The elevator management system of claim 1, wherein the destination floor can be overridden by a user input.

11. An elevator management method, comprising:
    detecting a tag within a detection area with a detector, the tag identifying a user and a preferred floor;
    obtaining a position of the tag from the tag;
    entering an elevator call to a destination floor;
    detecting whether the tag has entered and exited the elevator; and
    canceling the elevator call when the user exits the elevator before the elevator car reaches the destination floor.

12. The elevator management method of claim 11, wherein the destination floor is a preferred floor.

13. The elevator management method of claim 11, wherein the tag is a RFID tag.

14. The elevator management method of claim 11, wherein the tag is a mobile communication device.

15. The elevator management method of claim 11, wherein the detection area extends outside a building having an elevator.

16. The elevator management method of claim 11, further comprising canceling detection of the tag upon a user input.

* * * * *